(12) United States Patent
Xu et al.

(10) Patent No.: US 9,604,408 B2
(45) Date of Patent: Mar. 28, 2017

(54) BUILD MATERIAL AND APPLICATIONS THEREOF

(71) Applicant: 3D Systems, Inc., Rock Hill, SC (US)

(72) Inventors: Pingyong Xu, Valencia, CA (US); John Stockwell, Sylmar, CA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 15/172,347

(22) Filed: Jun. 3, 2016

(65) Prior Publication Data

US 2016/0279870 A1    Sep. 29, 2016

Related U.S. Application Data

(63) Continuation of application No. 13/043,876, filed on Mar. 9, 2011.

(51) Int. Cl.
| | |
|---|---|
| *B29C 67/00* | (2017.01) |
| *C08F 290/06* | (2006.01) |
| *C08G 18/67* | (2006.01) |
| *C08G 18/81* | (2006.01) |
| *C08L 75/16* | (2006.01) |
| *C09D 11/101* | (2014.01) |
| *C09D 11/34* | (2014.01) |
| *B33Y 10/00* | (2015.01) |
| *B33Y 40/00* | (2015.01) |
| *B33Y 50/02* | (2015.01) |
| *B33Y 70/00* | (2015.01) |

(52) U.S. Cl.
CPC ...... *B29C 67/0066* (2013.01); *B29C 67/0088* (2013.01); *B29C 67/0092* (2013.01); *C08F 290/067* (2013.01); *C08G 18/672* (2013.01); *C08G 18/8175* (2013.01); *C08L 75/16* (2013.01); *C09D 11/101* (2013.01); *C09D 11/34* (2013.01); *B29C 67/0059* (2013.01); *B33Y 10/00* (2014.12); *B33Y 40/00* (2014.12); *B33Y 50/02* (2014.12); *B33Y 70/00* (2014.12); *Y10T 428/24802* (2015.01)

(58) Field of Classification Search
CPC .................................................. A01B 12/006
See application file for complete search history.

(56) References Cited

U.S. PATENT DOCUMENTS

| | | |
|---|---|---|
| 3,089,782 A | 5/1963 | Bush et al. |
| 3,804,640 A | 4/1974 | Buckwalter |
| 4,112,182 A | 9/1978 | Newland |
| 4,247,508 A | 1/1981 | Housholder |
| 4,567,570 A | 1/1986 | Peer |
| 4,575,330 A | 3/1986 | Hull |
| 4,623,688 A | 11/1986 | Flanagan |
| 4,665,492 A | 5/1987 | Masters |
| 4,741,930 A | 5/1988 | Howard et al. |
| 4,751,102 A | 6/1988 | Adair et al. |
| 4,752,352 A | 6/1988 | Feygin |
| 4,772,530 A | 9/1988 | Gottschalk et al. |
| 4,772,541 A | 9/1988 | Gottschalk et al. |
| 4,775,945 A | 10/1988 | Cavill et al. |
| 4,863,538 A | 9/1989 | Deckard |
| 4,961,154 A | 10/1990 | Pomerantz et al. |
| 4,992,806 A | 2/1991 | Peer |
| 4,999,143 A | 3/1991 | Hull et al. |
| 5,001,354 A | 3/1991 | Gould et al. |
| 5,015,312 A | 5/1991 | Kinzie |
| 5,015,424 A | 5/1991 | Smalley |
| 5,031,120 A | 7/1991 | Pomerantz et al. |
| 5,059,266 A | 10/1991 | Yamane et al. |
| 5,121,329 A | 6/1992 | Crump |
| 5,134,569 A | 7/1992 | Masters |
| 5,136,515 A | 8/1992 | Helinski |
| 5,141,680 A | 8/1992 | Almquist et al. |
| 5,143,663 A | 9/1992 | Leyden et al. |
| 5,149,548 A | 9/1992 | Yamane et al. |
| 5,182,715 A | 1/1993 | Vorgitch et al. |
| 5,198,159 A | 3/1993 | Nakamura et al. |
| 5,204,055 A | 4/1993 | Sachs et al. |
| 5,209,878 A | 5/1993 | Smalley et al. |
| 5,273,691 A | 12/1993 | Hull et al. |
| 5,282,140 A | 1/1994 | Tazawa et al. |
| 5,313,232 A | 5/1994 | Peer |
| 5,340,656 A | 8/1994 | Sachs et al. |
| 5,398,193 A | 3/1995 | deAngelis |
| 5,453,121 A | 9/1995 | Nicholls et al. |
| 5,510,066 A | 4/1996 | Fink et al. |
| 5,514,209 A | 5/1996 | Larson, Jr. |
| 5,574,084 A | 11/1996 | Peacock |
| 5,740,051 A | 4/1998 | Sanders, Jr. et al. |

(Continued)

FOREIGN PATENT DOCUMENTS

| | | |
|---|---|---|
| EP | 0322257 | 6/1989 |
| EP | 0388129 | 9/1990 |

(Continued)

OTHER PUBLICATIONS

Extended European Search Report mailed Aug. 6, 2014 (9 pages).
English translation of Chinese First Office Action dated Aug. 1, 2014 (11 pages).
English translation of Chinese Second Office Action dated Jun. 15, 2015 (10 pages).
PCT International Search Report for International Application No. PCT/US2012/026086 mailed Jun. 6, 2012 (5 pages).

(Continued)

*Primary Examiner* — Larry Thrower

(57) ABSTRACT

In one aspect, build materials operable for use in 3D printing systems are described herein. In some embodiments, a build material comprises an oligomeric curable material, a reactive component that is solid at 25° C., and at least one diluent, wherein the reactive component comprises at least one chemical moiety that is polymerizable with a chemical moiety contained in the oligomeric curable material and/or the at least one diluent.

20 Claims, No Drawings

(56) References Cited

U.S. PATENT DOCUMENTS

| | | | |
|---|---|---|---|
| 5,855,836 A | 1/1999 | Leyden et al. |
| 5,936,027 A | 8/1999 | Zahrobsky et al. |
| 5,938,826 A | 8/1999 | Baker et al. |
| 5,958,169 A | 9/1999 | Titterington et al. |
| 5,959,020 A | 9/1999 | Oliveri et al. |
| 6,010,564 A | 1/2000 | Zhu et al. |
| 6,132,665 A | 10/2000 | Bui et al. |
| 6,133,355 A | 10/2000 | Leyden et al. |
| 6,193,922 B1 | 2/2001 | Ederer |
| 6,193,923 B1 | 2/2001 | Leyden et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,339,112 B1 | 1/2002 | Kauffman et al. |
| 6,395,811 B1 | 5/2002 | Nguyen et al. |
| 6,467,897 B1 | 10/2002 | Wu et al. |
| 6,476,122 B1 | 11/2002 | Leyden |
| 6,508,971 B2 | 1/2003 | Leyden et al. |
| 6,569,373 B2 | 5/2003 | Napadensky |
| 6,586,494 B2 | 7/2003 | Mejiritski et al. |
| 6,644,763 B1 | 11/2003 | Gothait |
| 6,658,314 B1 | 12/2003 | Gothait |
| 6,660,209 B2 | 12/2003 | Leyden et al. |
| 6,713,125 B1 | 3/2004 | Sherwood et al. |
| 6,841,116 B2 | 1/2005 | Schmidt |
| 6,841,589 B2 | 1/2005 | Schmidt et al. |
| 7,176,253 B2 | 2/2007 | Xu et al. |
| 7,211,368 B2 | 5/2007 | Coats et al. |
| 7,378,460 B2 | 5/2008 | Schmidt et al. |
| 7,399,796 B2 | 7/2008 | Xu et al. |
| 9,157,007 B2 | 10/2015 | Xu et al. |
| 2001/0003500 A1 | 6/2001 | Cheze et al. |
| 2002/0171177 A1 | 11/2002 | Kritchman et al. |
| 2003/0032692 A1 | 2/2003 | Mejiritski et al. |
| 2003/0069323 A1 | 4/2003 | Varlemann et al. |
| 2003/0100658 A1 | 5/2003 | Xu et al. |
| 2010/0055484 A1 | 3/2010 | Chretien |
| 2010/0140850 A1 | 6/2010 | Napadensky et al. |
| 2011/0196057 A1 | 8/2011 | Breton et al. |
| 2012/0231232 A1 | 9/2012 | Xu et al. |
| 2012/0287212 A1 | 11/2012 | Chretien et al. |

FOREIGN PATENT DOCUMENTS

| | | |
|---|---|---|
| EP | 0223587 | 2/1991 |
| EP | 0426363 | 5/1991 |
| EP | 0500225 | 8/1992 |
| EP | 0590957 | 4/1994 |
| EP | 0655317 | 5/1995 |
| EP | 0666163 | 8/1995 |
| EP | 1033222 | 9/2000 |
| GB | 2336594 | 10/1999 |
| JP | 5-33901 | 5/1993 |
| WO | 90/03986 | 4/1990 |
| WO | 91/12120 | 8/1991 |
| WO | 92/00820 | 1/1992 |
| WO | 94/19112 | 9/1994 |
| WO | 95/05935 | 3/1995 |
| WO | 95/05943 | 5/1995 |
| WO | 95/12485 | 5/1995 |
| WO | 00/11092 | 3/2000 |
| WO | 00/52624 | 9/2000 |
| WO | 00/76772 | 12/2000 |
| WO | 01/26023 | 4/2001 |
| WO | 01/68375 | 9/2001 |
| WO | 03/029365 | 4/2003 |
| WO | 2010/035006 | 4/2010 |

OTHER PUBLICATIONS

PCT Written Opinion of the International Searching Authority for International Application No. PCT/US2012/026086 mailed Jun. 6, 2012 (9 pages).

PCT International Preliminary Report on Patentability and Written Opinion of the International Searching Authority for International Application No. PCT/US2012/026086, mailed Sep. 19, 2013 (10 pages).

PCT International Search Report for International Application No. PCT/US2014/055095, mailed Nov. 25, 2014 (4 pages).

PCT Written Opinion of the International Search Authority for International Application No. PCT/US2014/055095, mailed Nov. 25, 2014 (4 pages).

D. Lopez et al., "Photocrosslinking of Dimethylaminopropylamrcylamide Copolymer," Radiation Physics and Chemistry, vol. 45 No. 4-5, pp. 975-977, 1995, Elsevier Science Ltd, Great Britain.

PCT International Preliminary Report on Patentability for International Application No. PCT/US2014/055095, mailed Mar. 24, 2016 (2 pages).

PCT Written Opinion of the International Search Authority for International Application No. PCT/US2014/055095, mailed Mar. 24, 2016 (4 pages).

European Patent Office. Office Communication dated Sep. 6, 2016. European Application No. 14 170 818.0-1302. Name of Applicant: 3D Systems, Inc. English Language. 5 pages.

BUILD MATERIAL AND APPLICATIONS THEREOF

CROSS REFERENCE TO RELATED APPLICATIONS

This application is a continuation of U.S. patent application Ser. No. 13/043,876, filed on Mar. 9, 2011.

FIELD OF THE INVENTION

The present invention relates to build materials for three dimensional (3D) printing systems.

BACKGROUND OF THE INVENTION

Commercially available three dimensional printers, such as the ProJet™ 3D Printers manufactured by 3D Systems of Rock Hill, S.C., use a build material or ink that is jetted through a print head as a liquid to form various thermopolymer parts. Other three dimensional printing systems also use a build material that is jetted through a print head. In some instances, the build material is solid at ambient temperatures and converts to liquid at elevated jetting temperatures. In other instances, the build material is liquid at ambient temperatures.

SUMMARY OF THE INVENTION

In one aspect, build materials operable for use in 3D printing systems are described herein which, in some embodiments, may offer one or more advantages over prior build materials. In some embodiments, for example, a build material described herein exhibits high stiffness, thereby providing finished parts that are useful in various engineering applications.

A build material described herein, in some embodiments, comprises an oligomeric curable material, a reactive component that is solid at 25° C., and at least one diluent, wherein the reactive component comprises at least one chemical moiety that is polymerizable with a chemical moiety contained in the oligomeric curable material and/or the at least one diluent. A build material described herein, in some embodiments, comprises an oligomeric curable material, a reactive component that is solid at 25° C., and at least one diluent, wherein the reactive component comprises a plurality of chemical moieties that are polymerizable with a chemical moiety contained in the oligomeric curable material and/or the at least one diluent. A build material described herein, in some embodiments, comprises an oligomeric curable material, a reactive component that is solid at 25° C., and at least one diluent, wherein the reactive component comprises at least one chemical moiety that is polymerizable with a chemical moiety contained in both the oligomeric curable material and the at least one diluent. In some embodiments, a build material described herein further comprises a non-reactive component that does not comprise a chemical moiety that is polymerizable with a chemical moiety contained in the oligomeric curable material or the at least one diluent.

A build material described herein, in some embodiments, comprises an oligomeric curable material, a reactive component that is solid and substantially crystalline at 25° C., and at least one diluent, wherein the reactive component comprises at least one chemical moiety that is polymerizable with a chemical moiety contained in the oligomeric curable material and/or the at least one diluent. In some embodiments, a build material described herein, when cured, exhibits a tensile modulus of about 1500 to about 2200 MPa when measured according to ASTM D 638.

In another aspect, compositions comprising three dimensionally printed articles or objects are described herein. In some embodiments, a composition comprises a three dimensionally printed article comprising a build material comprising an oligomeric curable material, a reactive component that is solid at 25° C., and at least one diluent, wherein the reactive component comprises at least one chemical moiety that is polymerizable with a chemical moiety contained in the oligomeric curable material and/or the at least one diluent. In some embodiments, the build material of a three dimensionally printed article further comprises a non-reactive component that does not comprise a chemical moiety that is polymerizable with a chemical moiety contained in the oligomeric curable material or the at least one diluent.

In some embodiments, a composition comprises a three dimensionally printed article comprising a build material that comprises an oligomeric curable material, a reactive component that is solid and substantially crystalline at 25° C., and at least one diluent, wherein the reactive component comprises at least one chemical moiety that is polymerizable with a chemical moiety contained in the oligomeric curable material and/or the at least one diluent. In some embodiments, a composition comprises a three dimensionally printed article comprising a build material that comprises an oligomeric curable material, a reactive component that is solid and substantially crystalline at 25° C., and at least one diluent, wherein the reactive component comprises more than one chemical moiety that is polymerizable with a chemical moiety contained in the oligomeric curable material and/or the at least one diluent. In some embodiments, a composition described herein comprises a three dimensionally printed article comprising a build material that, when cured, exhibits a tensile modulus of about 1500 to about 2200 MPa when measured according to ASTM D 638.

In another aspect, methods of printing a three dimensional article or object are described herein. In some embodiments, a method of printing a three dimensional article comprises selectively depositing layers of a fluid build material to form the three dimensional article on a substrate, the build material comprising an oligomeric curable material, a reactive component that is solid and substantially crystalline at 25° C., and at least one diluent, wherein the reactive component comprises at least one chemical moiety that is polymerizable with a chemical moiety contained in the oligomeric curable material and/or the at least one diluent. In some embodiments, the reactive component comprises at least one chemical moiety that is polymerizable with a chemical moiety contained in both the oligomeric curable material and the at least one diluent. In some embodiments, a method of printing a three dimensional article further comprises supporting at least one layer of the build material with a support material. Additionally, the build material and/or support material, in some embodiments of methods described herein, is selectively deposited according to an image of the three dimensional article, the image being in a computer readable format.

These and other embodiments are described in greater detail in the detailed description which follows.

DETAILED DESCRIPTION OF THE INVENTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention. The terms "three dimensional printing system," "three dimensional printer," "printing," and the like generally describe various solid freeform fabrication techniques for making three dimensional objects by selective deposition, jetting, fused deposition modeling, and other techniques now known in the art or that may be known in the future that use a build material to fabricate the three dimensional object.

In one aspect, build materials operable for use in 3D printing systems are described herein. A build material described herein is fluid at jetting temperatures encountered in 3D printing systems. In some embodiments, a build material solidifies by freezing once deposited on a surface during the fabrication of a three dimensionally printed article or object. In some embodiments, a build material remains substantially fluid upon deposition on a surface during the fabrication of a three dimensionally printed article or object. In some embodiments, a build material comprises an oligomeric curable material, a reactive component that is solid at about 25° C., and at least one diluent, wherein the reactive component comprises at least one chemical moiety that is polymerizable with a chemical moiety contained in the oligomeric curable material and/or the at least one diluent. In some embodiments, a build material further comprises a non-reactive component that does not comprise a chemical moiety that is polymerizable with a chemical moiety contained in the oligomeric curable material or the at least one diluent. In some embodiments, a build material further comprises one or more additives selected from the group consisting of photoinitiators, inhibitors, stabilizing agents, sensitizers, and combinations thereof.

As described herein, in some embodiments, a build material comprises an oligomeric curable material. Any suitable oligomeric curable material not incompatible with the objectives of the present invention can be used. In some embodiments, an oligomeric curable material comprises one or more curable chemical species. In some embodiments, an oligomeric curable material comprises one or more photocurable chemical species. In some embodiments, an oligomeric curable material comprises one or more UV-curable chemical species. In some embodiments, an oligomeric curable material is photo-curable at wavelengths ranging from about 300 nm to about 400 nm. Alternatively, in some embodiments, an oligomeric curable material is photo-curable at visible wavelengths of the electromagnetic spectrum.

In some embodiments, an oligomeric curable material described herein comprises one or more species of (meth)acrylates. As used herein, the term "(meth)acrylate" includes acrylate or methacrylate or mixtures or combinations thereof. In some embodiments, an oligomeric curable material comprises urethane (meth)acrylate resins. In some embodiments, UV curable urethane (meth)acrylate resins can comprise any methacrylate or acrylate resin which polymerizes in the presence of a free radical photoinitiator, is thermally stable in an exposed state for at least one week at the jetting temperature and for at least 4 weeks in an enclosed state, and/or has a boiling point greater than the jetting temperature. In some embodiments, an oligomeric curable material has a flash point above the jetting temperature.

Urethane (meth)acrylates suitable for use in build materials described herein can be prepared in a known manner, typically by reacting a hydroxyl-terminated oligomeric urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The molecular weight of such (meth)acrylate oligomers is generally in the range from about 400 to 10,000, or from about 500 to 7,000. Urethane (meth)acrylates are also commercially available from the SARTOMER Company under the product names CN980, CN981, CN975 and CN2901, or from Bomar Specialties Co. (Winsted, Conn.) under the product name BR-741. In some embodiments described herein, a urethane (meth)acrylate oligomer has a viscosity ranging from about 140,000 cP to about 160,000 cP at about 50° C. In some embodiments described herein, a urethane (meth)acrylate oligomer has a viscosity ranging from about 125,000 cP to about 175,000 cP at about 50° C. In some embodiments described herein, a urethane (meth)acrylate oligomer has a viscosity ranging from about 100,000 cP to about 200,000 cP at about 50° C. In some embodiments described herein, a urethane (meth)acrylate oligomer has a viscosity ranging from about 10,000 cP to about 300,000 cP at about 50° C.

An oligomeric curable material can be present in a build material as described herein in any amount not inconsistent with the objectives of the present invention. In some embodiments, an oligomeric curable material is present in the build material composition in an amount ranging from about 10 weight percent to about 50 weight percent. An oligomeric curable material, in some embodiments, is present in the build material composition in an amount ranging from about 20 weight percent to about 40 weight percent.

In some embodiments described herein, the oligomeric curable material and the reactive component each contain one or more functional groups or chemical moieties that can react with one another, for example in a polymerization reaction. In some embodiments, the oligomeric curable material and the reactive component are capable of reacting with one another through free radical polymerization. In some embodiments, the oligomeric curable material and the reactive component are capable of reacting with one another through polymerization between points of unsaturation. In some embodiments, the oligomeric curable material and the reactive component are capable of reacting with one another through polymerization of ethyleneically unsaturated moieties. In some embodiments, the oligomeric curable material and the reactive component can each contain one or more reactive functional groups comprising the same chemical moiety. In other embodiments, the oligomeric curable material and the reactive component can each contain one or more reactive functional groups comprising different chemical moieties. In some embodiments, a build material described herein comprises an oligomeric curable material, a reactive component that is solid at about 25° C., and at least one diluent, wherein the oligomeric curable material and the reactive component each contain one or more acrylate or methacrylate moieties. In some embodiments, the oligomeric curable material and the reactive component each contain one or more vinyl moieties. In some embodiments, the oligomeric curable material and the reactive component each contain one or more vinyl ether moieties.

Some embodiments comprise a reactive component. In some embodiments, a build material as described herein comprises a reactive component that is solid. In some embodiments, a build material as described herein comprises a reactive component that is solid at about 25° C. In some embodiments, the reactive component is solid at about 30° C. In some embodiments, the reactive component is solid at about 40° C. In some embodiments, the reactive component is solid at about 50° C. In some embodiments, the reactive component is solid at about 75° C. In some embodiments, the reactive component is solid at standard temperature and pressure (STP) conditions.

In some embodiments, the reactive component is crystalline or substantially crystalline. In some embodiments, the reactive component is crystalline or substantially crystalline at one or more temperatures recited herein. In some embodiments, the reactive component is crystalline or substantially crystalline at about 25° C. In some embodiments, the reactive component is crystalline or substantially crystalline at about 30° C. In some embodiments, the reactive component is crystalline or substantially crystalline at about 40° C. In some embodiments, the reactive component is crystalline or substantially crystalline at about 50° C. In some embodiments, the reactive component is crystalline or substantially crystalline at about 75° C. In some embodiments, the reactive component is crystalline or substantially crystalline at standard temperature and pressure conditions.

In some embodiments, the reactive component remains crystalline or substantially crystalline when combined with other components to form a build material mixture. In some embodiments, the reactive component is present in the build material as crystalline or substantially crystalline regions. In some embodiments, the reactive component may be present in the build material as crystalline or substantially crystalline particles. In some embodiments, the particles are about 1 to about 100 μm in diameter. In some embodiments, the particles are about 1 to about 50 μm in diameter, about 1 to about 30 μm in diameter, about 1 to about 10 μm in diameter, about 500 to about 1000 nm in diameter, or about 100 to 500 nm in diameter. A build material described herein, in some embodiments, comprises an oligomeric curable material, a reactive component, and at least one diluent, wherein the reactive component comprises at least one chemical moiety that is polymerizable with a chemical moiety contained in the oligomeric curable material and/or the at least one diluent, and wherein the reactive component is solid and/or crystalline or substantially crystalline when combined with the other components of the build material.

As described herein, in some embodiments, the reactive component comprises one chemical moiety that is polymerizable with a chemical moiety contained in the oligomeric curable material and/or the at least one diluent. In some embodiments, the reactive component comprises more than one chemical moiety that is polymerizable with a chemical moiety contained in the oligomeric curable material and/or the at least one diluent. In some embodiments, the reactive component comprises two chemical moieties that are polymerizable with a chemical moiety contained in the oligomeric curable material and/or the at least one diluent. In some embodiments, the reactive component comprises three chemical moieties that are polymerizable with a chemical moiety contained in the oligomeric curable material and/or the at least one diluent. In some embodiments, the reactive component comprises more than three chemical moieties that are polymerizable with a chemical moiety contained in the oligomeric curable material and/or the at least one diluent.

In some embodiments, a monofunctional reactive component of a build material described herein comprises only one chemical moiety that is polymerizable with a chemical moiety contained in the oligomeric curable material or the at least one diluent in a certain way, for example through a polymerization reaction between ethyleneically unsaturated moieties. Non-limiting examples of monofunctional reactive components suitable for use in some embodiments described herein include chemical species that are solid at one or more temperatures described herein and contain only one (meth)acrylate group, only one ethyleneically unsaturated group, or only one vinyl group.

In some embodiments, a polyfunctional reactive component of a build material described herein comprises more than one chemical moiety that can react with a chemical moiety contained in the oligomeric curable material or the at least one diluent. In some embodiments, a polyfunctional reactive component of a build material described herein comprises more than one chemical moiety that can react with a chemical moiety contained in the oligomeric curable material or the at least one diluent through a polymerization reaction between ethyleneically unsaturated moieties. Non-limiting examples of polyfunctional reactive components suitable for use in some embodiments described herein include chemical species that are solid at one or more temperatures described herein and contain more than one (meth)acrylate group, more than one ethyleneically unsaturated group, or more than one vinyl group.

In some embodiments, a difunctional reactive component comprises two chemical moieties that can react with chemical moieties contained in an oligomeric curable material. In some embodiments, a difunctional reactive component comprises two chemical moieties that can react with chemical moieties contained in an oligomeric curable material through a polymerization reaction between ethyleneically unsaturated moieties. Non-limiting examples of difunctional reactive components suitable for use in some embodiments described herein include chemical species that are solid at one or more temperatures described herein and contain two (meth)acrylate groups, two ethyleneically unsaturated groups, or two vinyl groups.

In some embodiments, a trifunctional reactive component comprises three chemical moieties that can react with chemical moieties contained in an oligomeric curable material. In some embodiments, a trifunctional reactive component comprises three chemical moieties that can react with chemical moieties contained in an oligomeric curable material through a polymerization reaction between ethyleneically unsaturated moieties. Non-limiting examples of trifunctional reactive components suitable for use in some embodiments described herein include chemical species that are solid at one or more temperatures described herein and contain three (meth)acrylate groups, three ethyleneically unsaturated groups, or three vinyl groups.

In some embodiments described herein, a build material comprises an oligomeric curable material, a reactive component that is solid at about 25° C., and at least one diluent, wherein the reactive component comprises at least one chemical moiety that is polymerizable with a chemical moiety contained in the oligomeric curable material and/or the at least one diluent, and wherein the reactive component comprises at least one of the following: a urethane (meth)acrylate, a urea (meth)acrylate, and an isocyanurate (meth)acrylate. A non-limiting example of a urethane (meth)acrylate useful in some embodiments is 2-methacryloxyethyl phenyl urethane, which is commercially available from Hampford Research, Inc., under the trade name 2-MEP. In some embodiments, the reactive component is selected from the group consisting of (i) an isocyanurate tri(meth)acrylate; (ii) a species defined by the formula $R^1$—NHCOO—$R^2$—$R^3$, wherein $R^1$ is $C_nH_{(2n+2)}$ (wherein n=4-36), $R^2$ is $C_nH_{(2n+2)}$ (wherein n=2-36), and $R^3$ is —OCOCH=$CH_2$ or —OCOC($CH_3$)=$CH_2$; (iii) a species defined by the formula $R^1$— $R^2$—NHCOO—$R^3$—OOC—NH—$R^2$—$R^1$, wherein $R^1$ is —OCOCH=$CH_2$ or —OCOC($CH_3$)=$CH_2$, $R^2$ is $C_nH_{(2n+2)}$ (wherein n=2-36), and $R^3$ is $C_nH_{(2n+2)}$ (wherein n=2-36); (iv) a species defined by the formula $R^1$—NHCONH—$R^2$—$R^3$, wherein $R^1$ is $C_nH_{(2n+2)}$ (wherein n=4-36), $R^2$ is $C_nH_{(2n+2)}$ (wherein n=2-36), and $R^3$ is —OCOCH=$CH_2$ or —OCOC($CH_3$)=$CH_2$; and (v) a species defined by the formula $R^1$—$R^2$—NHCONH—$R^3$—OOC—NH—$R^2$—$R^1$, wherein $R^1$ is —OCOCH=$CH_2$ or —OCOC($CH_3$)=$CH_2$, $R^2$ is $C_nH_{(2n+2)}$ (wherein n=2-36), and $R^3$ is $C_nH_{(2n+2)}$ (wherein n=2-36).

In some embodiments, the reactive component comprises a nitrogen-containing ring. In other embodiments, the reactive component is an isocyanurate. In some embodiments, the reactive component is an isocyanurate tri(meth)acrylate. In some embodiments, the reactive component comprises tris(2-hydroxy ethyl)isocyanurate triacrylate. Non-limiting examples of an isocyanurate triacrylate useful in some embodiments described herein include the species commercially available from the SARTOMER Company under the trade name SR 368 and from Hampford Research, Inc., under the trade name THEIC.

The amount of a reactive component in a build material described herein can be selected according to one or a variety of factors including the jetting temperatures of the 3D printing system, the desired viscosity of the build material, the required mechanical integrity of the build material for printing applications, the desired deposition rates of the build material and any support material used, the desired break elongation of the cured build material, the desired tensile modulus of the cured build material, the desired tensile strength of the cured build material, and the desired resistance to distortion of the cured build material. In some embodiments, a reactive component as described herein comprises about 5 to about 50 percent by weight of a build material as described herein. In some embodiments, a reactive component as described herein comprises about 5 to about 30 percent by weight of a build material as described herein or about 5 to about 15 percent by weight of a build material as described herein or about 5 to about 10 percent by weight of a build material as described herein.

In some embodiments described herein, a reactive component exhibits a sharp melting point. In some embodiments, a reactive component melts over a narrow range of temperatures. In some embodiments, a reactive component melts over a temperature range of about 1° C. to about 10° C. In some embodiments, a reactive component melts over a temperature range of about 1° C. to about 8° C. In some embodiments, a reactive component melts over a temperature range of about 1° C. to about 5° C. In some embodiments, a reactive component having a sharp melting point melts over a temperature range of X±2.5° C., where X is the temperature at which the freezing point is centered (e.g., X=53° C.). In some embodiments described herein, a build material comprises an oligomeric curable material, a reactive component that is solid at about 25° C., and at least one diluent, wherein the reactive component comprises at least one chemical moiety that is polymerizable with a chemical moiety contained in the oligomeric curable material and/or the at least one diluent, and wherein the reactive component exhibits a melting point range of about 1° C. to about 10° C.

Additionally, in some embodiments, a reactive component of a build material described herein has a melting point over a broad range of temperatures applicable to 3D printing systems. Reactive components useful in some embodiments described herein can exhibit melting point ranges centered at any temperatures not incompatible with the objectives of the present invention. In some embodiments, a reactive component exhibits a melting point range centered between about 40° C. and about 100° C., inclusive. In some embodiments, a reactive component exhibits a melting point range centered between about 40° C. and about 50° C. In some embodiments, a reactive component exhibits a melting point range centered between about 51° C. and about 65° C. In some embodiments, a reactive component exhibits a melting point range centered between about 66° C. and about 80° C. In some embodiments, a reactive component exhibits a melting point range centered between about 81° C. and about 100° C.

Some embodiments comprise at least one diluent. Any suitable diluent known to one of skill in the art and not incompatible with the objectives of the present invention can be used. One or more diluents, in some embodiments, are added to the build material to control viscosity, but can also improve other physical properties of the material, including by improving adhesion of the cured composition to the build platform.

In some embodiments, at least one diluent in a build material as described herein comprises one or more chemical moieties that can react with a chemical moiety contained in the oligomeric curable material and/or the reactive component. In some embodiments, the at least one diluent comprises one or more chemical moieties that can react with a chemical moiety contained in the oligomeric curable material and/or the reactive component in a certain way, for example through a polymerization reaction between ethylenically unsaturated moieties.

In some embodiments, a build material comprises an oligomeric curable material, a reactive component that is solid at about 50° C., and at least one diluent, wherein the reactive component comprises at least one chemical moiety that is polymerizable with a chemical moiety contained in the oligomeric curable material and/or the at least one diluent, and wherein the at least one diluent contains one or more (meth)acrylate moieties. Any (meth)acrylic diluent not inconsistent with the objectives of the present invention can be used. In some embodiments, a (meth)acrylic diluent has a viscosity less than about 13 centipoise. Moreover, in some embodiments, a (meth)acrylic diluent is monofunctional or polyfunctional.

In some embodiments, an amount of (meth)acrylate diluent in the build material ranges from about 10 weight percent to about 60 weight percent. For low molecular weight materials, methacrylates, dimethacrylates, triacrylates, and diacrylates can be used in a variety of combinations. These include tetrahydrofurfuryl methacrylate, triethylene glycol dimethacrylate, 2-phenoxyethyl methacrylate, lauryl methacrylate, ethoxylated trimethylolpropane triacrylate, polypropylene glycol monomethacrylate, polyethylene glycol monomethacrylate, cyclohexane dimethanol diacrylate, and tridecyl methacrylate.

In some embodiments, a (meth)acrylic diluent comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl) methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

A (meth)acrylic diluent, in some embodiments, comprises one or more tri(meth)acrylates. In some embodiments, tri (meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate.

In some embodiments, a (meth)acrylic diluent of a build material comprises one or more higher functional acrylates or methacrylates such as dipentaerythritol monohydroxy pentaacrylate or bis(trimethylolpropane) tetraacrylate. In some embodiments, a (meth)acrylate diluent has a molecular weight ranging from about 250 to 700.

In some embodiments, a diluent is selected from the group consisting of allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethyihexyl (meth)acrylate, n-octyl (meth)acrylate, n-decyl (meth)acrylate and n-dodecyl (meth)acrylate, 2-hydroxyethyl (meth)acrylate, 2- and 3-hydroxypropyl (meth)acrylate, 2-methoxyethyl(meth)acrylate, 2-ethoxyethyl (meth)acrylate and 2- or 3-ethoxypropyl (meth)acrylate, tetrahydrofurfuryl methacrylate, 2-(2-ethoxyethoxy)ethyl acrylate, cyclohexyl methacrylate, 2-phenoxyethyl acrylate, glycidyl acrylate and isodecyl acrylate.

Non-limiting examples of diluents useful in some embodiments described herein include the following: isobornyl acrylate (IBOA), commercially available from SARTOMER under the trade name SR 506A; isobornyl methacrylate, commercially available from SARTOMER under the trade name SR 423A; and triethylene glycol dimethacrylate, commercially available from SARTOMER under the trade name SR 205.

Some embodiments comprise a non-reactive component that does not comprise a chemical moiety that is polymerizable with a chemical moiety contained in an oligomeric curable material or at least one diluent, as described herein. In some embodiments, a non-reactive component comprises one or more waxes. In some embodiments, suitable waxes comprise hydrocarbon waxes, including hydrogenated waxes, paraffin waxes, microcrystalline waxes, fatty ester waxes or mixtures thereof. In some embodiments, suitable waxes comprise one or more urethane waxes. In some embodiments of the present invention, a build material comprises an oligomeric curable material, a reactive component that is solid at about 25° C., at least one diluent, and a non-reactive component, wherein the reactive component comprises at least one chemical moiety that is polymerizable with a chemical moiety contained in the oligomeric curable material and/or the at least one diluent, and wherein the non-reactive component does not comprise a chemical moiety that is polymerizable with a chemical moiety contained in an oligomeric curable material or at least one diluent, and wherein the non-reactive component comprises one or more urethane waxes.

In some embodiments, a urethane wax of a non-reactive component of a build material is selected from a class of inert linear urethane waxes having the chemical formula $C_{18}H_{37}NRCOOC_nH_{(2n+1)}$ wherein n is an integer from 4 to 16, and R is H or C1-C20 alkyl. In some embodiments R is H. In some embodiments, R is C1-C6 alkyl. In some embodiments, R is C1-C10 alkyl. In some embodiments, R is C1-C20 alkyl. Additionally, in some embodiments, urethane waxes of the non-reactive component of a build material comprise ADS038 [1-dodecyl-N-octadecyl carbamate: $CH_3(CH_2)_{17}NHCOO(CH_2)_{11}CH_3$] and/or ADS043 [1-hexadecyl-N-octadecyl carbamate: $CH_3(CH_2)_{17}NHCOO(CH_2)_{15}CH_3$] waxes commercially available from American Dye Source, Inc. of Baie D'Urfe, Quebec, Canada. In some embodiments, the non-reactive component of a build material comprises a mixture of C10, C12, C14 and C16 urethane waxes, where Cn refers to the chain length on the oxygen side of the urethane moiety. In some embodiments, the chain lengths can be varied based on the desired viscosity and/or stiffness of the uncured build material; to obtain a cured build material having a desirable stiffness, break elongation, tensile modulus, stability at high temperature, and/or tensile strength; and/or to obtain a build material capable of being used in specific 3D printing systems to produce finished parts having desirable resolution and quality at a desirable speed. In some embodiments, the non-reactive component of a build material comprises a mixture of C10, C12, C14 and C16 urethane waxes in a weight ratio of about 1 to 1 to 1 to 1. In some embodiments, the weight ratio ranges from about 1 to 10 to about 1 to 10 to about 1 to 10 to about 1 to 10. In some embodiments, the weight ratio ranges from about 1 to 20 to about 1 to 20 to about 1 to 20 to about 1 to 20. In some embodiments, the non-reactive component of a build material comprises a mixture of ADS038 and ADS043, commercially available from American Dye Source. In some embodiments, the ratio of ADS038 to ADS043 is about 9 to 1. In some embodiments, the ratio of ADS038 to ADS043 is about 8 to 1, about 7 to 1, about 6 to 1, about 5 to 1, about 4 to 1, about 3 to 1, or about 2 to 1. In some embodiments, the ratio of ADS038 to ADS043 ranges from about 9 to 1 to about 2 to 1.

In some embodiments, a non-reactive component of a build material comprises a mixture of urethane waxes. In one embodiment, for example, a non-reactive component of a build material comprises a mixture of different carbon chain length urethane waxes, such as C10, C12, C14 and C16.

In some embodiments, a reactive component as described herein can be combined or mixed in a build material as described herein with a non-reactive component as described herein in any ratio not inconsistent with the objectives of the present invention. General guidelines for establishing a suitable ratio of the reactive component to the non-reactive component can include obtaining a build material having a desirable viscosity and/or stiffness; obtaining a cured build material having a desirable stiffness, break elongation, tensile modulus, stability at high temperature, and/or tensile strength; and/or obtaining a build material capable of being used in 3D printing systems to produce finished parts having desirable resolution and quality at a desirable speed. In some embodiments, the ratio of a reactive component as described herein to a non-reactive component as described herein is about 1:1 by weight. In some embodiments, the ratio of a reactive component as described herein to a non-reactive component as described herein is about 10:1 by weight, 8:1 by weight, 5:1 by weight, 4:1 by weight, 3:1 by weight, or 2:1 by weight. In some embodiments, the ratio of a reactive component as described herein to a non-reactive component as described herein is about 1:10 by weight, 1:8 by weight, 1:5 by weight, 1:4 by weight, 1:3 by weight, or 1:2 by weight.

In some embodiments, a build material described herein further comprises an additive that promotes rapid curing of the surface of a build material and/or promotes the production of a tack free finished part. In some embodiments, a build material described herein further comprises one or more additives selected from the group consisting of photoinitiators, inhibitors, stabilizing agents, sensitizers, and combinations thereof.

Some embodiments comprise build materials comprising an additive that promotes rapid curing of the surface of a build material and/or promotes the production of a tack free finished part. Any suitable additive for these purposes not inconsistent with the objectives of the present invention may be used. In some embodiments, an additive that promotes rapid curing of the surface of a build material and/or promotes the production of a tack free finished part comprises an amine modified oligomer. A non-limiting example of an amine modified oligomer useful in some embodiments described herein is Ebecryl 83, which is an amine modified acrylate oligomer commercially available from Cytec Corp. In some embodiments, an additional oligomeric species may be present in any amount not inconsistent with the objectives of the present invention. In some embodiments, an additional oligomeric species is present in a build material as described herein in an amount ranging from about 1 to about 5 weight percent. In some embodiments, an additional oligomeric species is present in a build material as described herein in an amount less than about 3 weight percent.

As a build material described herein comprises one or more curable compounds, a build material, in some embodiments, further comprises one or more photoinitiators. Any photoinitiator not inconsistent with the objectives of the present invention can be used in build materials described herein. In some embodiments, a suitable photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 365 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate. The chemical structures of some photoinitiators are provided below:

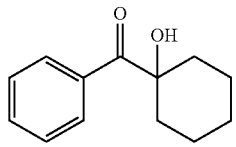

Irgacure 184

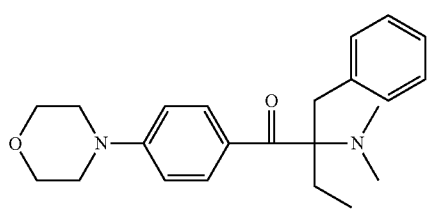

Irgacure 369

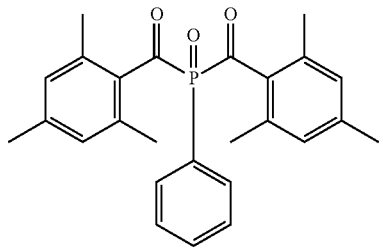

Irgacure 819

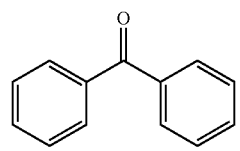

Daracure BP

In some embodiments, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

In some embodiments, suitable photoinitiators comprise those operable for use with a HeCd laser radiation source, including acetophenones, conveniently 2,2-dialkoxybenzophenones and 1-hydroxyphenyl ketones, for example 1-hydroxycyclohexyl phenyl ketone or 2-hydroxyisopropyl phenyl ketone (=2-hydroxy-2,2-dimethylacetophenone). Additionally, in some embodiments, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators comprises ionic dye-counter ion compounds capable of absorbing actinic radiation and generating free radicals for polymerization initiation. In some embodiments, compositions containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530 and 4,772,541.

A photoinitiator can be present in a build material in any amount not inconsistent with the objectives of the present invention. In some embodiments, a photoinitiator is present in a build material in an amount of up to about 5 weight percent. In some embodiments, a photoinitiator is present in a build material in an amount ranging from about 0.1 weight percent to about 5 weight percent.

Some embodiments comprise one or more sensitizers. Any sensitizer not inconsistent with the objectives of the present invention may be used. In some embodiments, a sensitizer comprises isopropylthioxanthone (ITX). In some embodiments, a sensitizer comprises 2-chlorothioxanthone (CTX). A sensitizer can be added to a build material to increase the effectiveness of one or more photoinitiators that may also be present. A sensitizer can be present in a build material in any amount not inconsistent with the objectives of the present invention. In some embodiments, a sensitizer is present in a build material in an amount ranging from about 0.1 weight percent to about 2 weight percent. A sensitizer, in some embodiments, is present in a build material in an amount ranging from about 0.5 weight percent to about 1 weight percent.

A build material, in some embodiments, further comprises one or more polymerization inhibitors or stabilizing agents. In some embodiments, a polymerization inhibitor comprises methoxyhydroquinone (MEHQ). A polymerization inhibitor can be added to a build material to provide additional thermal stability to the composition. In some embodiments, a stabilizing agent comprises one or more anti-oxidants. A stabilizing agent can comprise any anti-oxidant not inconsistent with the objectives of the present invention. In some embodiments, for example, suitable anti-oxidants include various aryl compounds, including butylated hydroxytoluene (BHT), which can also be used as a polymerization inhibitor in some embodiments.

A polymerization inhibitor and/or a stabilizing agent can be present in a build material in any amount not inconsistent with the objectives of the present invention. In some embodiments, a polymerization inhibitor is present in a build material in an amount ranging from about 0.1 weight percent to about 2 weight percent. A polymerization inhibitor, in some embodiments, is present in a build material in an amount ranging from about 0.5 weight percent to about 1 weight percent. In some embodiments, a stabilizing agent is present in a build material in an amount ranging from about 0.1 weight percent to about 5 weight percent or from about 0.5 weight percent to about 4 weight percent. In some embodiments, a stabilizing agent is present in a build material in an amount ranging from about 1 weight percent to about 3 weight percent.

Build materials described herein can exhibit a variety of desirable properties. Build materials used in embodiments described herein can have any suitable freezing and melting points not inconsistent with the objectives of the present invention. In some embodiments, a build material has freezing and melting points consistent with temperatures used in some 3D printing systems. In some embodiments, the freezing point of a build material is greater than about 40° C. In some embodiments, for example, a build material has a freezing point centered at a temperature ranging from about 45° C. to about 55° C. In some embodiments, a build material has a melting point centered at a temperature ranging from about 50° C. to about 80° C. A build material, in some embodiments, has a melting point ranging from about 50° C. to about 65° C. In some embodiments, the freezing point of a build material is lower than about 40° C. or lower than about 25° C.

In some embodiments, a build material has a viscosity consistent with the requirements and parameters of one or more 3D printing systems. In some embodiments, a build material described herein has a viscosity ranging from about 8.0 centipoise to about 14.0 centipoise at a temperature of about 65° C. In some embodiments, a build material has a viscosity ranging from about 9.5 centipoise to about 12.5 centipoise at a temperature of about 65° C. A build material, in some embodiments, has a viscosity ranging from about 10.5 centipoise to about 12.5 centipoise at a temperature of about 65° C.

In some embodiments, a build material described herein has a viscosity ranging from about 8.0 centipoise to about 19.0 centipoise at a temperature of about 80° C. In some embodiments, a build material described herein has a viscosity ranging from about 8.0 centipoise to about 13.5 centipoise at a temperature of about 80° C. A build material, in some embodiments, has a viscosity ranging from about 11.0 centipoise to about 14.0 centipoise at a temperature of about 80° C. In some embodiments, a build material has a viscosity ranging from about 11.5 centipoise to about 13.5 centipoise or from about 12.0 centipoise to about 13.0 centipoise at a temperature of about 80° C.

In some embodiments, a build material in the non-cured state has one or more of the following properties:
1. Melting point from about 45° C. to about 65° C. (MP must be less than the jetting temperature);
2. Freezing point from about 33° C. to about 60° C.;
3. Jetting viscosity of about 8 to about 16 cPs at 70-95° C.; and
4. Thermally stable for at least 3 days at the jetting temperature.

In some embodiments, a build material in the non-cured state has one or more of the following properties:
1. Melting point lower than about 25° C. (the melting point must in some embodiments be less than the jetting temperature but need not be at or above room temperature);
2. Freezing point lower than about 25° C.;
3. Jetting viscosity of about 8 to about 19 cPs at 70-95° C.; and
4. Thermally stable for at least 3 days at the jetting temperature.

Moreover, when in the cured state, a build material described herein, in some embodiments, can have one or more of the following properties:
1. Tensile strength of at least about 35 MPa (as measured by ASTM D 638);
2. Tensile modulus of at least about 1380 MPa (as measured by ASTM D 638);
3. Break elongation of at least 12% (as measured by ASTM D 638);
4. Hardness of at least 60 shore D (as measured by ASTM D 2240);
5. Impact strength of at least 0.2 ft-lb/in (10.7 N-cm/cm) (Izod notched, as measured by ASTM D 256);
6. Flexural strength of at least 10 MPa (as measured by ASTM D 638); and
7. Flexural modulus of at least 17 MPa (as measured by ASTM D 792).

In some embodiments, a build material when cured exhibits a tensile modulus of about 1500-2200 MPa when measured according to ASTM D 638. In some embodiments, a build material when cured exhibits a tensile modulus of about 1500-1900 MPa when measured according to ASTM D 638. In some embodiments, a build material when cured exhibits a tensile modulus of about 1550-1850 MPa when measured according to ASTM D 638. In some embodiments, a build material when cured exhibits a tensile modulus of about 1750-1850 MPa when measured according to ASTM D 638. In some embodiments, a build material when cured exhibits a tensile modulus of about 1700-1800 MPa when measured according to ASTM D 638.

In some embodiments, a build material when cured exhibits a break elongation of about 10-24% when measured according to ASTM D 638. In some embodiments, a build material when cured exhibits a break elongation of about 12-22% when measured according to ASTM D 638. In some embodiments, a build material when cured exhibits a break elongation of about 14-20% when measured according to ASTM D 638.

In some embodiments, a build material when cured exhibits a tensile strength of about 35-42 MPa when measured according to ASTM D 638. In some embodiments, a build material when cured exhibits a tensile strength of about 36-40 MPa when measured according to ASTM D 638. In some embodiments, a build material when cured exhibits a tensile strength of about 38-40 MPa when measured according to ASTM D 638.

In some embodiments, a build material when cured exhibits both a tensile modulus as described herein and a break elongation as described herein. In some embodiments, a build material when cured exhibits a tensile modulus of about 1500-2200 MPa when measured according to ASTM D 638 and an break elongation of about 10-24% when measured according to ASTM D 638. In some embodiments, a build material when cured exhibits a tensile modulus of about 1500-1900 MPa when measured according to ASTM D 638 and an break elongation of about 12-22% when measured according to ASTM D 638. In some embodiments, a build material when cured exhibits a tensile modulus of about 1550-1850 MPa when measured according to ASTM D 638 and an break elongation of about 14-20% when measured according to ASTM D 638. In some embodiments, a build material when cured exhibits a tensile modulus of about 1750-1850 MPa when measured according to ASTM D 638 and an break elongation of about 14-20% when measured according to ASTM D 638. In some embodiments, a build material when cured exhibits a tensile modulus of about 1700-1800 MPa when measured according to ASTM D 638 and an break elongation of about 12-22% when measured according to ASTM D 638.

Build materials described herein can exhibit desirable properties at elevated temperatures. In some embodiments, a build material when cured is capable of exhibiting a heat deflection temperature (HDT) ranging from about 45° C. to about 100° C. when tested according to ASTM D 648. In some embodiments, a build material when cured is capable of exhibiting an HDT ranging from about 45° C. to about 90° C. or about 45° C. to about 80° C. when tested according to ASTM D 648. In some embodiments, a build material when cured is capable of exhibiting an HDT ranging from about 60° C. to about 100° C. or about 60° C. to about 80° C. when tested according to ASTM D 648. In some embodiments, a build material when cured is capable of exhibiting an HDT ranging from about 70° C. to about 100° C., about 70° C. to about 90° C., or about 70° C. to about 80° C. when tested according to ASTM D 648.

In some embodiments, a build material as described herein is produced by placing all components of the build material in a reaction vessel and heating the resulting mixture to a temperature ranging from about 75° C. to about 85° C. with stirring. The heating and stirring are continued until the mixture attains a substantially homogenized molten state. The molten mixture is filtered while in a flowable state to remove any large undesirable particles that may interfere with jetting. The filtered mixture is then cooled to ambient temperatures until it is heated in the ink jet printer.

In another aspect, compositions comprising three dimensionally printed articles or objects are described herein. A three dimensionally printed article or object can comprise any embodiment of a build material described herein. In some embodiments, a composition comprises a three dimensionally printed article comprising a build material, the build material comprising an oligomeric curable material, a reactive component that is solid at 25° C., and at least one diluent, wherein the reactive component comprises at least one chemical moiety that is polymerizable with a chemical moiety contained in the oligomeric curable material and/or the at least one diluent. In some embodiments, the build material of a composition described herein further comprises a non-reactive component that does not comprise a chemical moiety that is polymerizable with a chemical moiety contained in the oligomeric curable material or the at least one diluent. In some embodiments, the reactive component is substantially crystalline at 25° C. In some embodiments, the reactive component comprises more than one chemical moiety that is polymerizable with a chemical moiety contained in the oligomeric curable material or the at least one diluent. In some embodiments, the oligomeric curable material and the reactive component each contain one or more acrylate or (meth)acrylate moieties. In some embodiments, the build material when cured exhibits a tensile modulus of 1500-2200 when measured according to ASTM D 638. In some embodiments, the build material when cured exhibits a break elongation of 10-24% when measured according to ASTM D 638.

In some embodiments, a composition comprises a three dimensionally printed article comprising a build material as described herein and further comprising a support material. A support material can be used to support at least one layer of a build material during the 3D printing process. In some embodiments, a three dimensionally printed article described herein comprises a plurality of layers of the build material, wherein the layers of the build material are deposited according to data in a computer readable format. In some embodiments, at least one of the deposited layers of build material is supported by a support material. In some embodiments, the support material is removable to complete production of the three dimensionally printed article or object.

In another aspect, methods of printing a three dimensional article or object are described herein. Embodiments of methods of printing a three dimensional article can comprise any embodiment of a build material described herein. In some embodiments, a method of printing a three dimensional article comprises selectively depositing layers of a fluid build material to form the three dimensional article on a substrate, the build material comprising an oligomeric curable material, a reactive component that is solid at 25° C., and at least one diluent, wherein the reactive component comprises at least one chemical moiety that is polymerizable with a chemical moiety contained in the oligomeric curable material and/or the at least one diluent. In some embodiments, the layers of the build material are deposited according to an image of the three dimensional article in a computer readable format. In some embodiments, the build material is deposited according to preselected computer aided design (CAD) parameters.

In some embodiments, a method of printing a three dimensional article further comprises supporting at least one of the layers of the build material with a support material. In some embodiments, a method of printing a three dimensional article further comprises curing the build material. In some embodiments, a method of printing a three dimensional article further comprises subjecting the build material to electromagnetic radiation of sufficient wavelength and intensity to cure the build material. In some embodiments of printing a three dimensional article, a layer of deposited build material is cured prior to the deposition of another or adjacent layer of build material.

In some embodiments, a preselected amount of build material described herein is heated to the appropriate temperature and jetted through the print head or a plurality of print heads of a suitable inkjet printer to form a layer on a build support platform in a build chamber. In some embodiments, each layer of build material is deposited according to the preselected CAD parameters. A suitable print head to deposit the build material, in some embodiments, is the piezoelectric Z850 print head available from Xerox Corporation's Office Products Business Unit in Wilsonville, Oreg. Additional suitable print heads for the deposition of build and support materials described herein are commercially available from a variety of ink jet printing apparatus manufacturers. For example, the Taipan print head available from Xerox or Ricoh print heads may also be used in some embodiments.

In some embodiments comprising a method of printing a three dimensional article comprising a build material as described herein, the build material solidifies upon deposition. In some embodiments, the build material remains substantially fluid upon deposition. In some embodiments, the temperature of the build environment can be controlled so that the jetted droplets of build material solidify on contact with the receiving surface. In other embodiments, the jetted droplets of build material do not solidify on contact with the receiving surface, remaining in a substantially fluid state. In some embodiments, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some embodiments, the wiper device comprises a roller and a wiper that removes excess material from the roller. In some embodiments, the wiper device is heated. The process is continued until a useful finished three dimensional design is prepared. It should be noted that the consistency of the jetted build material of the present invention prior to curing must be sufficient to retain its shape and not be subject to excessive viscous drag from the planarizer.

Moreover, a support material, in some embodiments, can be deposited in a manner consistent with that described herein for the build material. The support material, for example, can be deposited according to the preselected CAD parameters such that the support material is adjacent or continuous with one or more layers of the build material. Jetted droplets of the support material, in some embodiments, solidify or freeze on contact with the receiving surface. In some embodiments, the deposited support material is also subjected to planarization.

Layered deposition of the build material and support material can be repeated until the three dimensional article has been formed. In some embodiments, a method of printing a three dimensional article further comprises removing the support material from the build material. The support material can be removed by any means known to one of ordinary skill in the art and not inconsistent with the objectives of the present invention.

Embodiments described herein are further illustrated in the following non-limiting examples.

EXAMPLE 1

Build Material

A build material consistent with embodiments described herein was provided in accordance with the formulation of Table I.

TABLE I

Build Material

| Component | Amount (Wt. %) |
|---|---|
| Oligomeric Curable Material[1] | 40.93 |
| Reactive Component[2] | 5.90 |
| Diluent(s)[3] | 40.96 |
| Non-Reactive Component[4] | 5.96 |
| Additive for Curing/Tackiness[5] | 1.83 |
| Photoinitiator[6] | 4.29 |
| Sensitizer[7] | 0.10 |
| Inhibitor[8] | 0.02 |
| Total | 99.99 |

[1] 1:1 mixture of BR-741 and IBOA—Bomar Specialties Co., Winsted, CT.
[2] Tris(2-hydroxy ethyl)isocyanurate triacrylate-SR 368—SARTOMER Company, Exton, PA.
[3] Mixture of IBOA (20.07%), SR 423A (8.54%), and SR 205 (12.35%)—SARTOMER Company, Exton, PA.
[4] Mixture of C10, C12, C14, and C16 urethane waxes—Hampford Research, Inc., Stratford, CT.
[5] Amine modified oligomer-Ebecryl 83—Cytec Industries Inc., Willow Island, WV.
[6] Mixture of Irgacure 184 (3.94%) and Irgacure 819 (0.35%)—Ciba Specialty Chemicals, Inc. (BASF), Basel, Switzerland.
[7] ITX—Cytec Industries Inc., Willow Island, WV.
[8] BHT—Chemtura Corp. Middlebury, CT.

The oligomeric curable material (40.93 grams), reactive component (5.90 grams), diluents (40.96 grams), non-reactive component (5.96 grams), additive for curing/tackiness (1.83 grams), photoinitiator (4.29 grams), sensitizer (0.10 grams), and inhibitor (0.02 grams) were charged into a vessel equipped with mechanical stirring and a heating unit. The mixture was then heated to about 80° C.-90° C. After the mixture was melted, stirring was begun, and the mixture was blended for about 1-2 hours at 80° C.-90° C. The liquid was then filtered with a 1 micron filter to remove solid particles. The build material provided in Table I had a viscosity of 12.0 centipoise at a temperature of 65° C.

The resulting build material was jetted at about 65° C.-68° C. through a ProJet™ 3000 System from 3D Systems using a Xerox Z 850 print head to form three dimensional parts. The cured build material exhibited a tensile modulus of 1701 MPa when tested according to ASTM D 638, a break elongation of 19.9% when tested according to ASTM D 638, and a tensile strength of 38.8 MPa when tested according to ASTM D 638. Further, the cured build exhibited a heat deflection temperature (HDT) higher than about 70° C. when tested according to ASTM D 648.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three dimensional article comprising:
   selectively depositing layers of a fluid build material to form the three dimensional article on a substrate,
   wherein the build material comprises:
   an oligomeric curable material;
   a reactive component;
   a non-reactive component comprising one or more urethane waxes; and
   at least one diluent,
   wherein the reactive component comprises at least one chemical moiety that is polymerizable with a chemical moiety contained in the oligomeric curable material and/or the at least one diluent and wherein the reactive component is present in the build material as crystalline regions.

2. The method of claim 1, wherein the layers of the build material are deposited according to an image of the three dimensional article in a computer readable format.

3. The method of claim 1 further comprising supporting at least one of the layers of the build material with a support material.

4. The method of claim 1 further comprising curing the build material.

5. The method of claim 1, wherein the build material solidifies upon deposition.

6. The method of claim 1, wherein the build material remains substantially fluid upon deposition.

7. The method of claim 1, wherein the non-reactive component does not comprise a chemical moiety that is polymerizable with a chemical moiety contained in the oligomeric curable material or the at least one diluent.

8. The method of claim 1, wherein the build material further comprises one or more additives selected from the group consisting of photoinitiators, inhibitors, stabilizing agents, sensitizers, and combinations thereof.

9. The method of claim 1, wherein the oligomeric curable material is a urethane (meth)acrylate having a viscosity ranging from 10,000 cps to 300,000 cps.

10. The method of claim 1, wherein the oligomeric curable material and the reactive component each contain one or more acrylate or (meth)acrylate moieties.

11. The method of claim 1, wherein the reactive component comprises more than one chemical moiety that is polymerizable with a chemical moiety contained in the oligomeric curable material and/or the at least one diluent.

12. The method of claim 1, wherein the reactive component comprises at least one of the following: a urethane (meth)acrylate, a urea (meth)acrylate, and an isocyanurate (meth)acrylate.

13. The method of claim 1, wherein the reactive component is selected from the group consisting of:
   (i) an isocyanurate tri(meth)acrylate;
   (ii) a species defined by the formula $R^1$—NHCOO—$R^2$—$R^3$, wherein $R^1$ is $C_nH_{(2n+2)}$ (wherein n=4-36), $R^2$ is $C_nH_{(2n+2)}$ (wherein n=2-36), and $R^3$ is —OCOCH=$CH_2$ or —OCOC($CH_3$)=$CH_2$;
   (iii) a species defined by the formula $R^1$—$R^2$—NHCOO—$R^3$—OOC—NH—$R^2$—$R^1$, wherein $R^1$ is —OCOCH=$CH_2$ or —OCOC($CH_3$)=$CH_2$, $R^2$ is $C_nH_{(2n+2)}$ (wherein n=2-36), and $R^3$ is $C_nH_{(2n+2)}$ (wherein n=2-36);
   (iv) a species defined by the formula $R^1$—NHCONH—$R^2$—$R^3$, wherein $R^1$ is $C_nH_{(2n+2)}$ (wherein n=4-36), $R^2$ is $C_nH_{(2n+2)}$ (wherein n=2-36), and $R^3$ is —OCOCH=$CH_2$ or —OCOC($CH_3$)=$CH_2$; and
   (v) a species defined by the formula $R^1$—$R^2$—NHCONH—$R^3$—OOC—NH—$R^2$—$R^1$, wherein $R^1$ is —OCOCH=$CH_2$ or —OCOC($CH_3$)=$CH_2$, $R^2$ is $C_nH_{(2n+2)}$ (wherein n=2-36), and $R^3$ is $C_nH_{(2n+2)}$ (wherein n=2-36).

14. The method of claim 1, wherein the reactive component comprises a nitrogen-containing ring.

15. The method of claim 1, wherein the reactive component is an isocyanurate.

16. The method of claim 1, wherein the reactive component is tris(2-hydroxy ethyl)isocyanurate triacrylate.

17. The method of claim 1, wherein the reactive component comprises 5 to 50 percent by weight of the build material.

18. The method of claim 1, wherein the reactive component comprises 5 to 15 percent by weight of the build material.

19. The method of claim 1, wherein the reactive component exhibits a melting point range of 1° C. to 10° C., centered between 40° C. and 100° C.

20. The method of claim 1, wherein the at least one diluent contains one or more (meth)acrylate moieties.

* * * * *